United States Patent [19]

Lettieri

[11] 3,764,993

[45] Oct. 9, 1973

[54] WORD BACKSPACE CIRCUIT FOR BUFFERED KEY ENTRY DEVICE

[75] Inventor: John Lettieri, Woodstock, N.Y.

[73] Assignee: International Business Machines Corporation, Armonk, N.Y.

[22] Filed: June 22, 1971

[21] Appl. No.: 155,449

[52] U.S. Cl. .......... 340/172.5, 197/91

[51] Int. Cl. .......... G11c 19/00, G06f 11/00

[58] Field of Search .......... 235/145; 340/172.5; 197/91

[56] References Cited

UNITED STATES PATENTS

| | | | |
|---|---|---|---|
| 3,292,764 | 12/1966 | Midgette et al. | 199/18 |
| 3,470,539 | 9/1969 | Proud, Jr. et al. | 340/172.5 |
| 3,602,897 | 8/1971 | Igel | 340/172.5 |
| 3,624,283 | 11/1971 | Logan | 178/6.8 |
| 3,641,555 | 2/1972 | Griffin | 340/172.5 X |

OTHER PUBLICATIONS

IBM Technical Disclosure Bulletin, "Keyboard Scanning," by Beansoleil et al., Vol. 9, No. 5, Oct. 1966, page 532–533.

*Primary Examiner*—Paul J. Henon
*Assistant Examiner*—Paul R. Woods
*Attorney*—William S. Robertson et al.

[57] ABSTRACT

An improved word backspace circuit is provided for a key entry device having a shift register buffer memory that holds a character entered from the keyboard. As the operating position in the shift register buffer is backspaced toward the first character of a word, a logical operation is performed on each character of the record in a scanning operation that proceeds forward in the order that the characters of the record are entered in the buffer. In this forward scanning operation, each space is recognized and its occurrance is recorded in a latch. So long as the space is followed by at least one character position before the operating position in the buffer, the latch is reset and the backspace operation is continued to the next character position. When the space character position is followed immediately by the operating position, the latch is kept set to prevent a further backspace operation.

7 Claims, 5 Drawing Figures

INVENTOR
JOHN LETTIERI

BY W S Robertson

ATTORNEY

WORD BACKSPACE CIRCUIT FOR BUFFERED KEY ENTRY DEVICE

INTRODUCTION

In some key entry devices, a character that is keyed by an operator is entered into a shift register buffer memory. A field effect transistor shift register is an example of such a memory. Data is stored as a pattern of charges on an array of capacitors that are formed as part of a transistor circuit. In a shift operation, the charge state of each capacitor is transferred through associated transistor circuits to the next capacitor in the sequence. This operation regenerates the charge storage states of the capacitors and it also presents the data serially at the input-output stage of the memory. The sonic wire delay line has also been used in key entry devices; data is stored as a pattern of pulses that travel from the input end of the wire to the output end and are then electronically regenerated at the input end.

As an operator keys data into a shift register buffer, the operating position in the memory proceeds from one character position to the next. The operating position changes at the relatively slow rate at which an operator keys. By contrast, the operating position in the buffer is shifted past the input-output stage at electronic speeds. Thus, the operating position in the memory and all other positions are presented at the input-output stage several times during any keying operation or any mechanical operation by the key entry device. In the specific key entry device that will be described later, a counter is advanced as the operator keys a record. The counter indicates the next position in the buffer for entering a character and thus it forms part of the memory addressing circuit. In the terminology of a card punch, which records characters column by column, the counter is called a column counter. A second counter identifies the actual character and bit position of the memory that is available at the input-output stage. This counter is advanced by the memory clock. Data is entered in the memory only when the two counters agree, that is, when the character position at the memory input-output stage is in the position defined by the column counter. A logic circuit compares the two counters and produces a timing signal that will be called "Compare" that signals that the addressed character is available at the memory output. Thus, in a backspace operation, the column counter is decremented so that the Compare pulse occurs at an earlier character position of the buffer.

One of the advantages of a buffer in a key entry device is that the operator can backspace and rekey whenever an error is detected during keying. Ordinarily, fewer errors will be made during rekeying if the operator backspaces an entire word or an entire field instead of just backspacing to the character position where the error is believed to have occurred. Because the record is rekeyed after the backspace operation, these operations are sometimes called "field erase" and "word erase". An object of this invention is to provide a new and improved circuit of this type for a key entry device.

THE PRIOR ART

A description of prior art backspace circuits will introduce other objects and features of this invention. These circuits use programming bits and flag bits that are stored in the buffer with the character entered from the keyboard. A program is prearranged and controls certain operations according to the format of the cards being punched. A program bit called "field definition" identifies a field in the card where a particular entry is to be made and it identifies the end of a field backspace operation which will be described later. Flags are entered in the buffer temporarily for particular operations and a "Space Flag" identifies a space separating alphabetic words and is used in a word backspace operation of the known prior art.

In a field backspace operation, the column counter is decremented column by column and at each column the field definition bit of the program is interrogated to determine whether the new operating position is at the beginning of a field. When the program bit defining the start of the field is found, the backspace operation is stopped with the column counter in the first position in the field. The operator can then rekey the entire field.

A word backspace operation does not take place in this simplified way because the column counter is to be set one position ahead of the space and not on the space position. From the description of the field backspace, it can be seen that a word backspace operation might be performed partly in the same way as a field backspace by first backspacing to the space position and then by advancing one space to the first character position. A more specific object of this invention is to provide a new and improved word backspace circuit that avoids the extra step and the associated extra circuit components required by the backspace just described.

In one word backspace of the prior art, the buffer is scanned from the first entry to find the first space. The column counter is set to the column number of the first space and the scan is continued to either the next space or to a flag that identifies the last character position in which a character has been entered, whichever occurs first. If a space is found, the column counter is advanced to the position of the space. Finding the flag signifies that the column counter is one position before the position of the word that is to be backspaced, and the column counter is advanced one position to complete the backspace operation. An object of this invention is to provide a new and improved work backspace that backspaces position by position directly to the first character position of the word.

THE INVENTION

According to this invention, the field backspacing circuits of the type described in the last paragraph are used for decrementing the column counter from one position to the preceeding position in a word backspace operation. The circuit of this invention stops the backspacing when the first character position to the right of the space is found.

During each backspace operation, the memory is scanned at its electronic shifting rate and a latch is set on each occurrence of a Space Flag and coincident absence of the Compare signal (which signifies that the character of the operating position of the buffer memory is at the buffer input-output stage, as already explained). This latch is reset in response to the absence of the Compare signal and the coincident occurrence of a timing signal that occurs early in the memory cycle for each character. So long as there is a character position between the space character position and the operating position, this latch is set for the space character and is reset for the next character. When the column counter has been decremented to the position just to the right of the space position, the latch is set in response to the Space Flag, as has just been described, but the occurrence of a Compare signal in the next position inhibits resetting the latch. Thus, the coincidence of the setting of this latch and the Compare signal signifies that the column counter is at the position for the end of the backspace operation. A second latch responds to this logical product to inhibit a further backspace.

From a more general standpoint, the circuit of this invention backspaces to a new operating position just to the right of the position that is identified by a flag or by a predetermined character or both. With each backspace of one character position, the circuit scans the memory at electronic speed in the forward direction and performs a sequential logic operation to detect first the occurrence of the flag (or the character or both) and then the occurrence of the operating position in the next position. From this more general standpoint, it can be seen that the invention is useful with shift register buffers in which the characters appear in a predetermined but non-consecutive sequence at the buffer output. Similarly, the invention is useful with non-shifting registers (such as a random access core memory) having a column counter to produce a shift register like operation for a data entry device of the general type being described. The invention is also useful with data entry devices in which the program bits are presented field by field in contrast to the character by character arrangement that is used in the data recorder of the drawing.

THE DRAWING

THE CIRCUIT OF THE DRAWING

Introduction

Figure 1:
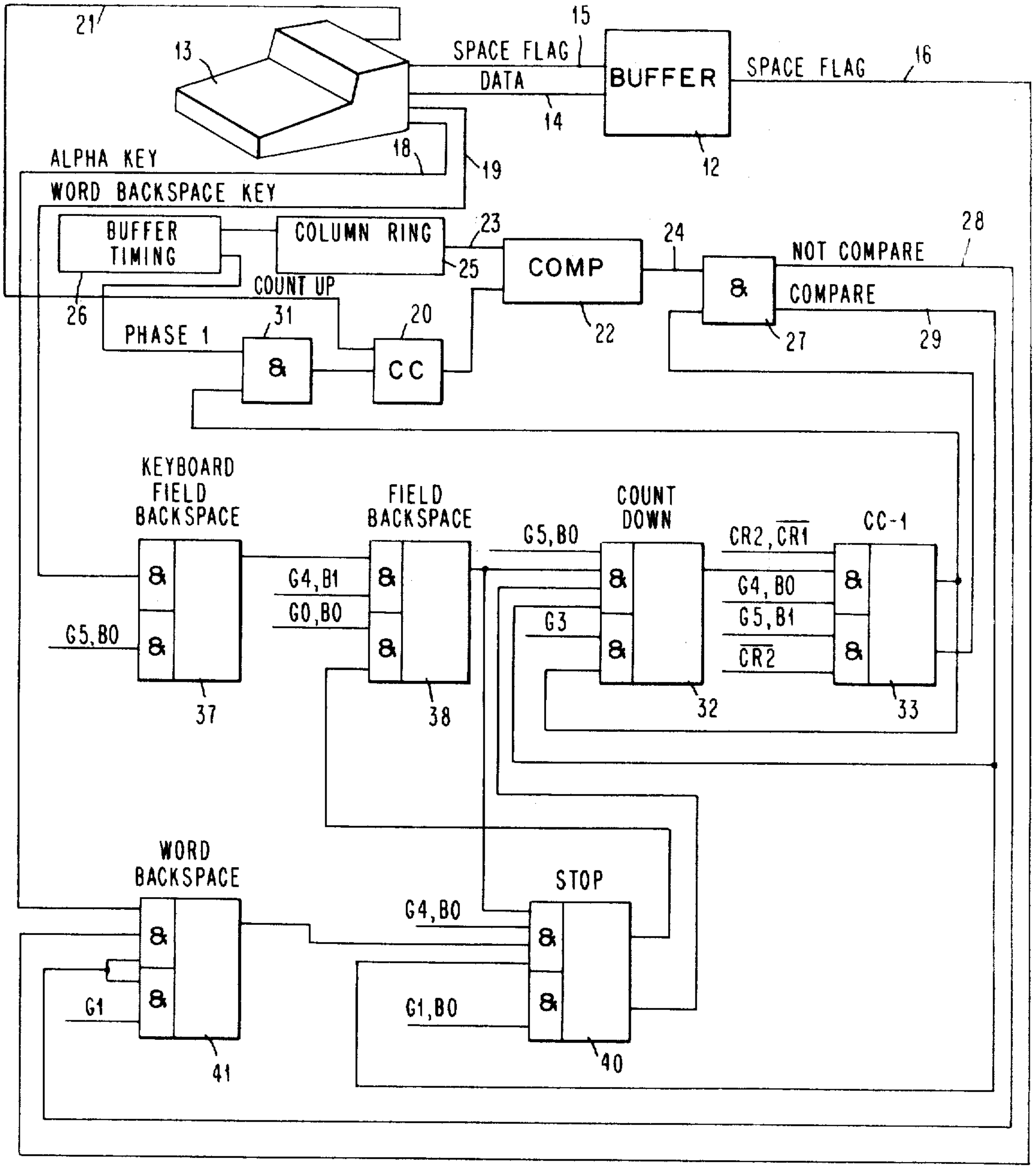
FIG. 1 is a schematic of a key entry device with the word backspace circuit of this invention.

In this description, the terminology is taken from a manual entitled "IBM 129 Card Data Recorder, Models 1, 2 and 3 — SY22-6871-1", published 1971, which describes a specific key entry device that uses the word backspace circuit of the drawing. This publication is available from the assignee of this invention. FIG. 1 shows a buffer memory system 12 of a buffered key entry device. A keyboard 13 enters into buffer 12, characters on a line 14 and various control bits including a Space Flag on a line 15. Buffer 12 supplies the characters to control a punch mechanism that is not shown. The buffer also supplies the Space Flag on a line 16 and various other control signals to the logic circuits that are associated with the buffer. The keyboard 13 also supplies various control signals to the logic circuits, including a conventional alpha key output on a line 18 which signifies that a key signals an alphabetic character and not a numeric or special character. A word backspace key on the keyboard produces a signal on a line 19 that is applied to the word backspace circuit of this convention.

In the familiar unbuffered punch or verifier, a card advances under a punch or a reader as the operator keys, and an indicator shows the operator the column in which the next keying operation will take place. In the buffered punch, the card is held stationary until the keying is completed, and the column where the next keying operation takes place is identified by a column counter 20. Column counter 20 is a counting circuit that repetitively counts from 1 through 80 on each column of a card in response to an input COUNT UP on a line 21 to the column counter from the keyboard (The logic circuits forming the COUNT UP signal are described on page 9–3 of the cited publication.) As will be explained later, the column counter cooperates with the buffer memory timing circuits 26 for addressing the next location in the buffer where a character is to be entered.

Figure 2:
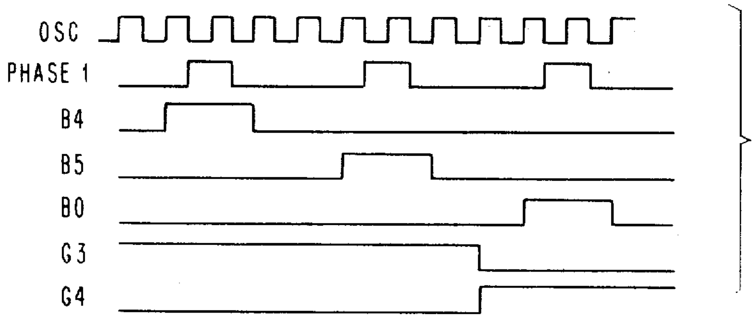
FIGS. 2, 3, 4A and 4B are timing charts showing the operation of the word backspace circuit of FIG. 1.

FIG. 2 shows timing waveforms that illustrate features of the buffer memory organization that are important in the operation of the word backspace circuit of the drawing. The actual time intervals represented in FIG. 2 are not specifically relevant to the invention, but they will be helpful in understanding the relationships of the operations which take place at electronic speeds and the operations that take place at the keying speed of an operator. All other waveforms are derived from a 2 megacycle oscillator waveform shown uppermost in FIG. 2. Buffer 12 is a serial shift register buffer that is advanced by two phases of timing pulses, one of which, called phase 1, is also used in the backspace circuit and is shown in FIG. 2. With the occurrence of each phase 1 pulse at 2 microsecond intervals, one bit position of buffer 12 is available at an input-output stage for a read or write operation. Buffer 12 holds 80 columns and has 36 bit positions for each column. Thus, the buffer has 2,880 bits. An individual bit position is identified by the waveforms of FIGS. 2 and 3. The 36 bits for each character are divided into six groups of six bits each. Within each group, the bits are identified by six timing pulses B0 through B5 which are represented in FIG. 2 by the waveforms for the sequence B4, B5, and B0. These pulses occur at 2 microsecond intervals as the buffer shifts, and each of the six pulses reoccurs at 12 microsecond intervals. Similarly, the portions of the 12 microsecond pulses for the group timing signals G3 and G4 illustrate the six group timing pulses G0 through G5. Thus, a character time or column in the buffer is scanned in 72 microseconds of buffer operation.

Group times G0, G1, and G2 each store the six bits of a program. (The program portion of the buffer is not specifically relevant to this disclosure.) Group times G3 holds various flags, including the space flag which is entered into the memory on line 15 and read from the memory on line 16. Group times G4 and G5 provide 12 bit positions for storing a character in the conventional Hollerith code. Thus, particular group and bit times define particular bits in the memory. For example, bit time G3,B4 signifies whether or not the G4 and G5 bit locations for the same character position of the buffer hold a data pattern that represents a space. A logical 1 in this position is called a Space Flag and is carried on buffer output line 16. As will be seen in the later description of the logic circuit of FIG. 1, the bit timing pulses also provide convenient timing pulses for logic functions that are independent of the related bit in the memory.

Figure 3:
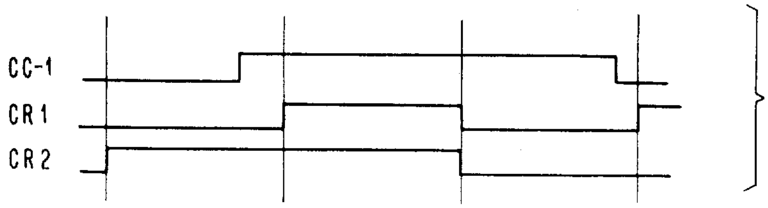

The timing circuits also identify the column at the input-output stage of the buffer. A counter circuit called a column ring 25 is advanced each 72 microseconds by a pulse from buffer timing circuit 26 as a new column enters the input-output position of buffer 12. When the count of the column ring agrees with the count of column counter 20, the column of the buffer that is next to receive an input from keyboard 13 is available at the input-output stage for reading program or flag bits and for writing character bits or new flag bits. A compare circuit 22 receives the output of the column ring on a line 23 and the output of column counter 20 and produces a timing signal on a line 24 when the counts agree. Signal 24 is transmitted through a gate 27 that will be described later to produce a compare signal on a line 28 and its complement, NOT Compare, on a line 29. The Compare signal is applied to buffer addressing circuits that are not shown in the drawing and it is applied to the word backspace circuit of the drawing. The column ring and the column counter may produce their outputs in any suitable form, but preferably, the outputs of the low order digits represent binary numbers. In FIG. 3, the low order bit position CR1 produces a positive pulse for 72 microseconds for one column in the buffer and a 0 level output for the next column. Similarly, the waveform CR2 produces a positive pulse for two consecutive columns and a 0 level for the next two consecutive columns. Thus, lines CR1 and CR2 together produce the repeating counting sequences 00, 01, 10, and 11 which corresponds for example, to the decimal column number sequence 80, 1, 2 and 3. As will be explained later, FIG. 3 shows how timing signals CR1 and CR2 are used to define an interval of three consecutive columns during which the column counter is set to the next lower number.

The word backspace circuit will be described in the following three parts: first, the circuits that decrement the counter for backspacing one column, next, the circuits that start this operation and continue it from column to column until stopped, and then the circuits that stop the operation from continuing past the first column of the word.

The Counter Decrementing Components

For decrementing column counter 20, 79 phase 1 pulses are transmitted to an AND gate 31 to advance the column counter. This operation can be understood by recognizing that column 1 follows column 80 in the counting sequence of the column counter and 80 incrementing pulses would advance the counter through a full cycle to the count where the incrementing operation started. Thus, 79 pulses advance the counter to the immediately preceding column and have the same effect as subtracting 1 from the column counter. A latch 33 (CC–1 for column counter subtract 1) has its set output connected to open gate 31 and it has its set and reset inputs timed to maintain gate 31 open for transmitting exactly 79 phase 1 pulses to column counter 20. To begin this operation, a latch 32, Count Down, is set (as will be described in the next section) to enable latch 33 to be set and reset in response to its timing inputs.

A condition for setting latch 33 is CR2,NOT CR1, and a condition for resetting latch 33 is NOT CR2. As FIG. 3 shows, these conditions define an interval of three columns. The sequence shown in FIG. 3 occurs on every fourth column ring count in the decimal sequence 2, 6, etc., and as will be explained later, the latch responds to a sequence immediately following a Compare pulse. Latch 33 also responds at its set input to the timing pulse G4,B0 and at its reset input to the timing pulse G5,B1.

As FIG. 2 shows, the bit timing pulses that control latch 33 rise before the associated phase 1 pulses that are transmitted through gate 31 to column counter 20. Thus, when latch 33 is set at time G4,B0, the phase 1 pulse associated with bit time G4,B0 is transmitted to column counter 20. Thus, in the first column of FIG. 3 in which latch 33 is set, column counter 20 receives the 12 phase 1 pulses that correspond to bit times G4,B0 through G5,B5. Similarly, latch 33 is reset and gate 31 is closed at time G5,B1 before the corresponding phase 1 pulse is available at the input of gate 31. Thus, in the third column of FIG. 3, column counter 20 receives the 31 phase 1 pulses that correspond to bit times G0,B0 through G5,B0. Thus, in each of the three consecutive columns of FIG. 3, column counter 20 receives 12, 36 and 31 phase 1 pulses for a total of 79 phase 1 pulses.

When latch 33 is set, it enables latch 32 to be reset on the next G3 timing pulse so that the operation just described will stop after one decrement operation unless latch 32 is again set. The next part of this specification describes how latch 32 is set in response to the word backspace key and is further set at the end of each backspace operation so long as the backspace operation is to continue.

The Backspace Starting Circuits

Closing the Word Backspace key on keyboard 13 energizes line 19 and sets a latch called Keyboard Field Backspace (this part of the circuit is used also for the field backspace operation which was described earlier). The set output of latch 37 conditions the latch 38, Field Backspace, to be set at bit time G4,B1. Latch 37 is then reset at the following bit time G5,B0 and takes no further part in the operation of the circuit. Latch 38 remains set throughout the backspace operation until it is reset by an input from a Stop latch 40 that will be described in the next section. So long as latch 38 is set, it enables latch 32 to be set for the decrement operation described in the preceding section and to be again set for a further decrement operation as required. Latch 32 responds at its set input to the Compare signal on line 29, to a timing pulse G5,B0, and a signal from the reset output of the latch 40. Latch 33 has its reset output connected to gate 27 to inhibit transmitting Compare signals on line 28 during a decrement operation. Thus, when latch 32 is reset at the beginning of a decrement operation, as already described, it cannot be again set until the G5,B0 time of the first Compare pulse that occurs after the decrement operation has been completed. So long as the Field Backspace latch is set, the decrement operation proceeds column by column until latch 40 is set to inhibit again setting latch 32. Latch 40 and the associated circuits will be described next.

The Word Backspace Circuit

As FIG. 1 shows, the latch 40 has both its set inputs connected to receive the Compare pulse on line 28 so that the latch can SET only during a Compare pulse. Latch 40 receives a set input from a latch 41 and a set input at time G4,B0. Thus, latch 40 is set at a time G4,B0, after the setting of latch 41 to prevent further backspacing. Latch 40 is subsequently reset at the next G1,B0.

Latch 41 is set to record the occurrence of a Space Flag in a character position preceding the column of the column counter and it is reset by any subsequent character containing column preceding the column of the column counter. Latch 41 receives the NOT Compare signal at both its set and reset inputs so that it can change state only during the NOT Compare pulse. Setting latch 41 also requires a signal produced on line 18 when the alpha key is closed. (When the alpha key is open, the circuit of the drawing is used for a field backspace operation.)

Figure 4A:
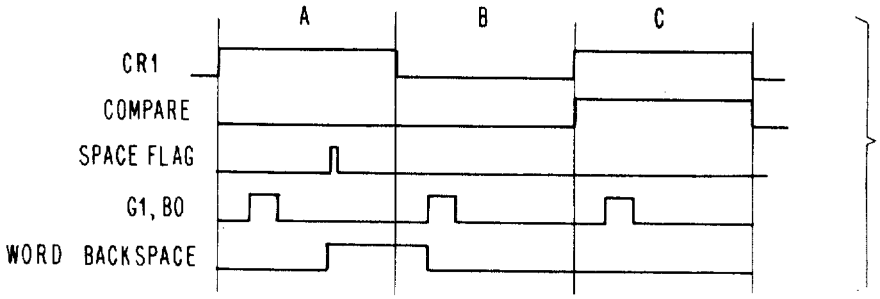
Figure 4B:
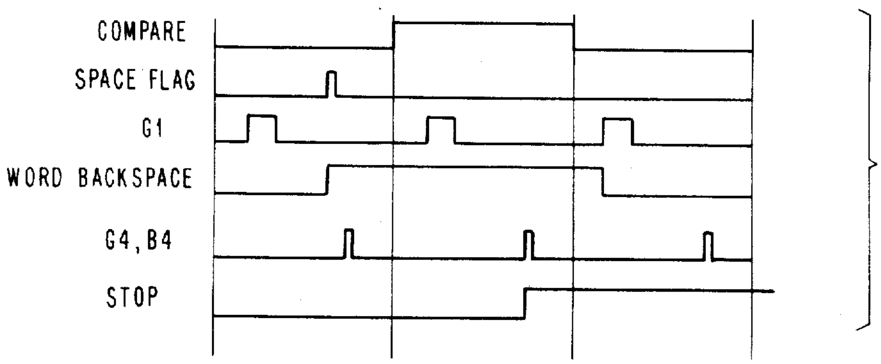

FIGS. 4A and 4B show the operation through three consecutive columns designated A, B and C. As the compare and Space Flag waveforms in 4A show, the backspace operation that is illustrated is to move the operating position from column C to column B. Word backspace latch 41 is set in column A on the coincidence of the Space Flag at time G3,B4 and the NOT Compare signal on line 29. (The NOT Compare pulse is the complement of the Compare pulse shown in the drawing.) In column B, latch 41 is reset on coincidence of the timing pulse G1 and the NOT Compare pulse. Since Stop latch 40 can be set only on coincidence of the set state of latch 41 and the Compare signal, the Stop latch remains reset during the operation of FIG. 4A, and at time G1,B0 in column C. Latch 32 is set to begin another decrement operation that moves the Compare pulse from column C to column B.

FIG. 4B shows the operation after column counter 20 has been decremented and gate 27 has been reopened to to transmit Compare and NOT Compare pulses. Latch 40 is set in column A in the way that has already been described. In column two, resetting of latch 41 is inhibited by the presence of the Compare pulse. Thus, latch 41 remains set from time G3 in column A to time G1 in column C. At time G4,B0 in column B, latch 40 is set in response to the coincidence of the set state of word backspace latch 41 and the Compare pulse. Latch 40 remains set until time G1,B0 in the next Compare pulse. At time G0,B0 in column C, latch 38 is reset to inhibit the decrement operation that would otherwise begin with setting latch 32 at time G5,B0 of column C.

Thus, a word backspace circuit has been described that backs the operating position only to the left most character position before a space and then stops the backspace operation. The circuit for recognizing the sequence of a Space Flag and a Compare pulse for stopping the backspace operation can be readily adapted to various logic technologies and to provide various functionally similar operations in various key entry devices. Those skilled in the art will recognize many variations and adaptations of the circuit of the drawing within the spirit of the invention and the scope of the claims.

What is claimed is:

1. In a key entry device having, a buffer memory having sequentially addressable column positions for storing characters or spaces keyed from a keyboard, a column counter incremented by keyboard operations for identifying the next buffer column position where an entry is to be made, means producing a scanning operation through the buffer in the order in which data columns are entered from the keyboard and identifying the column position being scanned, means comparing the count of the column counter and the column number identified by the scanning means for producing a Compare signal signifying that the scanning operation has reached the buffer column position where the next entry is to be made, and means for reading bits previously stored at said next column and for entering new bits from the keyboard, and means for successively subtracting one column from the count of the column counter for backspacing column by column in the buffer memory, wherein the improvement comprises, means to record in the scanning operation the occurrence of a space storing column, and means responsive to the occurrence of said Compare signal in the next column in the scanning sequence to stop the backspace operation in the column after said space storing column.

2. The key entry device of claim 1 further comprising means responsive to the occurrence of a column in the scanning sequence between said space containing column and said Compare signal for resetting said means to record a space to no longer signify the occurrence of a space containing column.

3. The key entry device of claim 2 wherein said means to record the occurrence of a space storing column comprises a latch connected to be set in response to the coincidence of a backspace key on said keyboard, an alpha key on said keyboard, and said space storing column.

4. The key entry device of claim 2 wherein a space is encoded as a 1 bit flag in a predetermined bit position of a group of bit positions making up a column position in the buffer and said means to record the occurrence of a space storing column comprises means connecting said latch to be set on the coincidence of said backspace key and said Space Flag.

5. The key entry device of claim 4 including means connecting said latch to be reset at a predetermined time in a column following a Space Flag column in the absence of a Compare signal.

6. The key entry device of claim 5 including means connecting said latch to change state only in the absence of said Compare signal.

7. In a key entry device having, a shift register buffer memory having sequentially addressable column positions to store character and space entries from a keyboard in a serial sequence of a predetermined number of memory bits for each column, means defining a 1 bit output location for said buffer memory, a counter identifying the column of the buffer positioned at said output location, a column counter identifying the column location in the buffer where a next entry is to take place, and means for backspacing said column counter, whereby a next entry may be made at a column location containing a previously entered character or space, wherein the improvement comprises, a key on said keyboard identified as a word backspace key, a latch connected to be set on the coincidence of a signal from said word backspace key and a signal from said output location signifying that a column containing a space is present, means for resetting said latch on the occurrence of a subsequent column location at said output location other than said next column location in which an operation is to take place, and means responsive to the set state of said latch and the occurrence at said output location of said column location where the next operation is to take place for stopping a backspace operation.

* * * * *